United States Patent
Enderli et al.

(10) Patent No.: US 10,012,727 B2
(45) Date of Patent: Jul. 3, 2018

(54) METHOD FOR DETECTING TARGETS AND ASSOCIATED MULTIFUNCTION RADAR

(71) Applicant: THALES, Courbevoie (FR)

(72) Inventors: Cyrille Enderli, Elancourt (FR); Jean-Yves Delabbaye, Vieille Eglise en Yvelines (FR)

(73) Assignee: THALES, Courbevoie (FR)

( * ) Notice: Subject to any disclaimer, the term of this patent is extended or adjusted under 35 U.S.C. 154(b) by 367 days.

(21) Appl. No.: 15/021,904

(22) PCT Filed: Sep. 18, 2014

(86) PCT No.: PCT/EP2014/069912
§ 371 (c)(1),
(2) Date: Mar. 14, 2016

(87) PCT Pub. No.: WO2015/040121
PCT Pub. Date: Mar. 26, 2015

(65) Prior Publication Data
US 2016/0231423 A1  Aug. 11, 2016

(30) Foreign Application Priority Data
Sep. 20, 2013  (FR) ..................... 13 02186

(51) Int. Cl.
*G01S 13/87* (2006.01)
*G01S 13/04* (2006.01)
*G01S 13/02* (2006.01)

(52) U.S. Cl.
CPC .............. *G01S 13/87* (2013.01); *G01S 13/04* (2013.01); *G01S 2013/0245* (2013.01); *G01S 2013/0272* (2013.01)

(58) Field of Classification Search
CPC ................. G01S 13/953; G01S 13/913; G01S 2013/0245; G01S 2013/0272; G01S 13/88;
(Continued)

(56) References Cited

U.S. PATENT DOCUMENTS

| 5,130,715 A | * | 7/1992 | Yanagisawa | G01S 13/426 342/158 |
| 2003/0218565 A1 | * | 11/2003 | Budic | G01S 7/023 342/90 |

(Continued)

FOREIGN PATENT DOCUMENTS

EP  2 453 251 A1  5/2012

OTHER PUBLICATIONS

François Le Chevalier, "Space-Time Transmission and Coding for Airborne Radars," Radar Science and Technology, vol. 6, No. 6, Dec. 2008, pp. 411-421, XP009130674.
(Continued)

*Primary Examiner* — Olumide T Ajibade Akonai
(74) *Attorney, Agent, or Firm* — Baker & Hostetler LLP

(57) ABSTRACT

A method for detecting targets, implemented by a multifunction radar wherein the radar comprises an antenna subdivided into at least two portions and is configured to transmit at least two types of signals on distinct frequency bands and to perform at least one ground detection or imaging function. During the transmission phases of an antenna portion, the reception of each antenna portion of the radar is cut. The method comprises, for each range gate, a step of reception of signals, a step of estimation of the autocorrelation matrix associated with the interferences the ground returns and from the thermal noise of the radar and a step of target detection using a test of the generalized
(Continued)

maximum likelihood. A multifunction radar configured to implement the method for detecting targets is provided.

12 Claims, 5 Drawing Sheets

(58) Field of Classification Search
CPC .......... G01S 7/003; G01S 13/86; G01S 13/94; G01S 7/28; G01S 13/87; G01S 13/885; G01S 13/89; G01S 17/107; Y02A 90/18; Y02A 90/19; H01Q 21/0025; H01Q 21/06; H01Q 23/00; H01Q 1/085; H01Q 1/3233
See application file for complete search history.

(56) References Cited

U.S. PATENT DOCUMENTS

| | | | |
|---|---|---|---|
| 2004/0150554 A1* | 8/2004 | Stenger | H01P 1/047 342/175 |
| 2004/0263378 A1 | 12/2004 | Jossef et al. | |
| 2009/0109083 A1* | 4/2009 | Tietjen | G01S 13/28 342/91 |
| 2010/0245162 A1* | 9/2010 | Krikorian | G01S 7/28 342/202 |
| 2011/0057831 A1* | 3/2011 | Shinomiya | G01S 3/74 342/74 |
| 2011/0285582 A1* | 11/2011 | Zhang | G01S 7/024 342/26 R |

OTHER PUBLICATIONS

J. L. Milin et al., "AMSAR—A European Success Story in AESA Radar," IEEE Aerospace and Electronic Systems Magazine, vol. 25, No. 2, Feb. 2010, pp. 21-28, XP011306683.
J. Ward, "Space-Time Adaptive Processing for Airborne Radars," M.I.T. Lincoln Laboratory Technical Report 1015, Dec. 1994.
P. Dempster et al., "Maximum Likelihood from Incomplete Data via the EM Algorithm," Journal of the Royal Statistical Society B, vol. 39, No. 1, pp. 1-38, 1977.

* cited by examiner

METHOD FOR DETECTING TARGETS AND ASSOCIATED MULTIFUNCTION RADAR

CROSS-REFERENCE TO RELATED APPLICATIONS

This application is a National Stage of International patent application PCT/EP2014/069912, filed on Sep. 18, 2014, which claims priority to foreign French patent application No. FR 1302186, filed on Sep. 20, 2013, the disclosures of which are incorporated by reference in their entirety.

FIELD OF THE INVENTION

The present invention relates to the general field of radars, notably that of airborne radars. The present invention relates more particularly to a method for detecting an aerial target and an associated multifunction radar.

BACKGROUND

One problem in the field of airborne radars is performing a number of simultaneous radar functions requiring the implementation of different waveforms with just one and the same antenna. Among these radar functions, air/air detection, air/ground detection and ground imaging can for example be cited.

When an air/ground function is being carried out, such as, for example, a detection of moving targets on the ground (or GMTI, which stands for Ground Moving Target Indicator), the radar is continuously scanning the ground; thus, the air surveillance cannot be assured and tracking operations are interrupted which can compromise a mission, particularly if a single carrier is employed for the performance thereof. The same problem arises in the case of SAR (Synthetic Aperture Radar) imaging.

In the case of SAR imaging, the illumination and image formation time can typically last from one to several tens of seconds, even a minute depending on the desired resolution on the image, on the image capture range, on the ground observation angle, on the speed of movement of the carrier. As an example, if a resolution of 30 cm is wanted at a distance of 60 km, the required angular resolution is 5 μrad. With a carrier moving at a speed of 240 m/s and observing the ground with an angle of 45°, the illumination time for a wavelength of 3 cm is then approximately 18 s.

The interruption of the aerial tracking operations for a number of tens of seconds, even longer than a minute, can be problematical. Despite this interruption, the status parameters of the targets could be extrapolated so as to rapidly reacquire the targets at the end of the time allotted for the SAR, assuming that they are moving in a straight line. For maneuvering targets, the extrapolations will generally give results that do not make it possible to resume the tracking operations after such a long interruption.

Also, the tactical situation can change with new targets which are not detected since, in addition to the current tracking operations, the surveillance is also interrupted during the SAR image capture which can constitute a significant handicap during the mission.

The color transmission techniques associated with an array of antennas with multiple input/output ports (MIMO, Multiple Input Multiple Output) are techniques that can make it possible to perform a number of radar functions simultaneously. The principles of color transmission are notably described in a paper by François Le Chevalier: "Space-time transmission and coding for airborne radars" published in Radar Science and Technology, volume 6, December 2008. These color transmission radars make it possible to use new beam-forming techniques and new waveforms, in which different signals are transmitted simultaneously in different directions to jointly code the space and time. These signals are then processed coherently on reception. These new techniques make it possible to optimize the overall performance levels of the radar for a given mission, while being more robust to electromagnetic counter-measures. These techniques make it possible, among other things, to increase the instantaneous angular coverage of a radar in exchange, for example, for a larger radar bandwidth or more numerous radar ambiguities. These techniques use a generalization of the antennas with subarrays because they make use of a number of collocated transmission channels in addition to the reception channels.

In an airborne context, the number of subarrays will necessarily remain limited to the order to ten or so, for costs and bulk reasons. The maximum widening of the instantaneous angular coverage will therefore remain limited to a factor $\sqrt{10} \approx 3$ in both vertical and horizontal directions, that is to say approximately 10° for the usual wavelengths and antenna sizes. Now, in the case of SAR imaging for example, it is obligatory to illuminate the ground with an angle of a number of tens of degrees, this angle being able to be constant during the illumination time (case of the "StripMap" mode) or else locked so as to illuminate a fixed zone on the ground (case of the "SpotSar" mode). Referring to FIG. 1, the aerial angular field to be covered is approximately 120° in the horizontal plane and up to 15° in elevation (i.e. 0.55 sr). Consequently, the widening of the angular coverage is insufficient to illuminate the combination of the fields associated with the air-air and air-ground functions.

Furthermore, the different variants of the color transmission techniques demand the use of waveforms with pulse repetition intervals common to the transmission channels which involves revising the design and the development of the current modes.

Another drawback lies in the fact that the transmission array simultaneously covers a wide field in elevation. This means powering each of the feeds of the transmission array with a coded signal, the codes having to be all mutually orthogonal. The necessary electronics and the associated processing are therefore complex, and all the more so when the size of the array is significant.

A multifunction radar is known from the prior art, notably in the publication by J.-L. Milin et al. "AMSAR—A European Success Story in AESA Radar", Proc. International Radar Conference, October 2009. In this device, the antenna is structured in subarrays consisting of a subset of the radiating elements distributed over the total surface area of the antenna. The antenna transmits by a sum channel and the subarrays, in reception, make it possible to apply space-time processing operations in order to reduce the nuisance caused by the spurious ground echoes.

One drawback with this structure is that it has only one transmission channel, so it does not therefore make it possible to transmit a number of different waveforms simultaneously.

One way of assuring an aerial surveillance while a "ground" function (GMTI or SAR) is being carried out consists in interleaving the two "air" and "ground" functions. This technique is known by the term "interleaved scanning" or long-term color transmission. In this type of transmission, the pulses are transmitted successively in different directions, possibly with an additional phase or frequency coding per pulse.

This transmission concept does indeed allow for a wider quasi-instantaneous angular coverage; however, it does introduce additional speed ambiguities in each direction explored.

Furthermore, when applied to the issue of the simultaneous performance of "air" and "ground" functions such as, for example, target detection or SAR imaging, the interleaved scanning compromises the hitherto qualified waveforms. In effect, the air/ground waveforms have low recurrence frequency so as not to have range ambiguities; now, the air/air functions support this type of waveform badly, notably because of the speed ambiguities of the fast targets. It is therefore necessary to provide the waveforms with additional properties to cancel or reduce the speed ambiguity effect.

The use of the interleaved scanning concept to simultaneously perform a number of radar functions therefore requires significant modifications to the structure of the radars, with complete requalification of the waveforms. The consequence is a relatively long-term installation and a very high cost.

SUMMARY OF THE INVENTION

One aim of the invention is notably to correct some of the abovementioned drawbacks by proposing a method for detecting aerial targets and an associated multifunction radar.

To this end, the subject of the invention is a method for detecting aerial targets, implemented by a multifunction radar comprising an antenna subdivided into at least two antenna portions, each antenna portion being configured to perform the transmission and the reception of a signal, the method being characterized in that:

each antenna portion of the radar is configured to transmit signals on distinct frequency bands, during the transmission phases of an antenna portion, the reception of each antenna portion of the radar is cut resulting in a reception signal comprising missing data, the radar is configured to simultaneously perform at least two radar functions including an aerial target detection function, and in that the method comprises, for each range gate:

a step of reception of signals, a step of estimation, from the signals received, of a space-time autocorrelation matrix so as to model the spurious ground echoes, a step of target detection using a statistical test by taking into account missing data in the reception signals and said space-time autocorrelation matrix.

According to a variant implementation, the step of target detection is performed using a test of generalized maximum likelihood.

According to a variant implementation, in the step of estimation of the autocorrelation matrix, the missing data are replaced by the average of the signals effectively received.

According to a variant implementation, the step of estimation of the autocorrelation matrix is performed using an estimation algorithm.

According to a variant implementation, the step of estimation of the autocorrelation matrix is performed using an expectation-maximization algorithm.

According to a variant implementation, the step of estimation of the autocorrelation matrix comprises a step of grouping of the data to form groups of data having an identical pattern of omission.

According to a variant implementation, the averages by which the missing data have been replaced are stored in memory so as to be re-used without computation.

According to a variant implementation, the time correlation of the ground echoes is taken into account by using a sliding time window.

According to a variant implementation, the step of target detection comprises a step of grouping of the data according to their pattern of omissions.

Another subject of the invention is a multifunction radar configured to implement the target detection method previously described, said radar comprising an antenna subdivided into at least two portions, each antenna portion comprising at least one transmission module and at least one reception module, each transmission module being configured to transmit transmission signals on distinct frequency bands and each reception module being configured to interrupt the reception when a transmission module transmits, the radar further comprising at least one processing module configured to implement the detection method previously described, said radar being configured to simultaneously perform at least two radar functions, including an aerial target detection function.

According to a variant embodiment, at least one antenna portion is divided into a number of subarrays, the group of at least one transmission module of the antenna portion being configured to group said subarrays together, during the transmission phase, so as to form just a single transmission channel.

According to a variant embodiment, the radar is an airborne radar.

BRIEF DESCRIPTION OF THE DRAWINGS

Other particular features and advantages of the present invention will become more clearly apparent on reading the following description, given in an illustrative and nonlimiting manner, and with reference to the attached drawings, in which.

DETAILED DESCRIPTION

Figure 1:
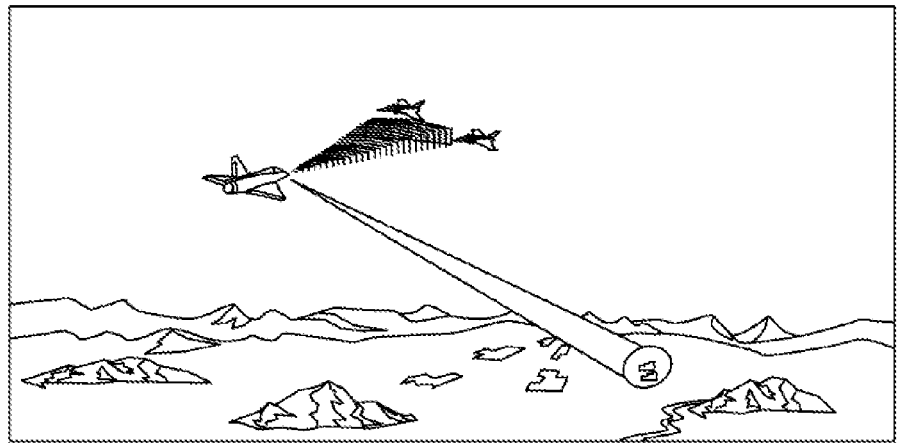
FIG. 1 represents an example of angular coverages in the air/air and air/ground functions.
Figure 2:
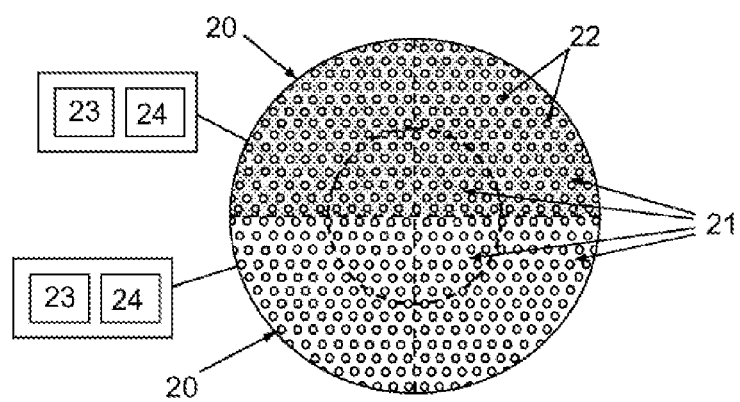
FIG. 2 represents an exemplary embodiment of the antenna of a multifunction radar according to the invention.

FIG. 2 represents an exemplary embodiment of the antenna of a multifunction radar according to the invention.

In this example, the radar antenna is divided into two independent parts or antenna portions 20, each dedicated to a radar function. Obviously, this example is in no way limiting and can be extended to a subdivision of the radar antenna into a greater number of portions 20.

According to an exemplary embodiment, the radar can be an airborne radar, an antenna portion being dedicated to an air/ground radar function and the other portion to an air/air function.

Each antenna portion 20 comprises at least one transmission channel and at least one reception channel. Each channel comprises different antenna subarrays.

Each antenna portion 20 comprises at least one transmission module 23 and at least one reception module 24 configured to respectively drive the subarrays 21 of the transmission and reception channels.

According to an embodiment, at least one antenna portion 20 can be divided into a number of subarrays 21, a subarray 21 being formed from a subset of the radiating elements 22 distributed over the total surface area of the radar antenna.

According to one embodiment, during the radar transmission phase, the transmission module or modules 23 of an antenna portion 20 can combine the different subarrays 21 to form just one transmission channel in order to maximize the focus of the transmission beam for the radar scan. For that, the transmission module or modules 23 of the antenna portion 20 are configured to group the subarrays 21 together, to form only a single transmission channel.

One advantage of the dividing of the antenna into a number of independent antenna portions 20 is that it makes it possible to use the radar waveforms which are currently employed for each radar function without being required to modify the recurrence frequency and/or the duration of the pulses transmitted for one or other of the functions. However, this dividing of the antenna leads to two constraints:

For the echoes of a waveform from a part of the radar not to mix with the echoes from the others, it is necessary to isolate each of the contributions. One way of achieving this can consist in having the antenna portions operate in transmission and reception in frequency subbands that are well separated and filtered on reception. To this end, the transmission modules 23 of each antenna portion are configured to transmit signals on distinct and well separated frequency bands. This can be interpreted as a "space-frequency" coding. Depending on the transmission zone position ("space" coding) a different frequency is used ("frequency" coding). On reception, the sorting of the signals is performed as a function of the carrier frequency of the signals received.

A second constraint lies at the reception level. Although the antenna portions operate in distinct subbands, it is not possible to transmit and receive simultaneously with the same antenna because of the couplings that exist between the radiating elements. Thus, when an antenna portion transmits a signal, the reception of the other antenna portions must be cut. The reception modules 24 of each antenna portion are therefore configured to interrupt the reception when at least one antenna portion transmits a signal. The radar functions therefore become full of gaps on reception, that is to say that the signal received by each antenna portion shows missing data. This second constraint therefore requires the processing of the signal on reception to be modified to take account of the omissions.

Figure 3:
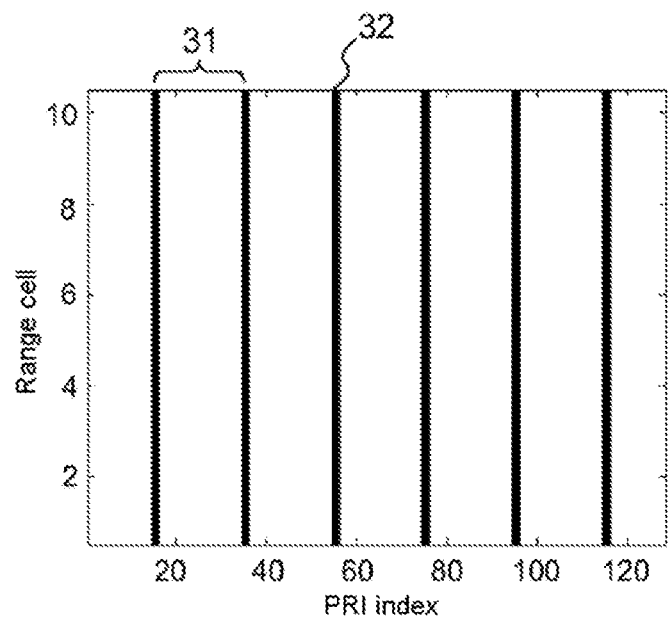
FIG. 3 represents an exemplary time diagram of transmission and reception phases of a multifunction radar according to the invention.

As an illustration, FIG. 3 presents an exemplary time diagram of transmission and reception phases of a radar simultaneously allowing for an air/ground function and an air/air function. In this example, the aerial tracking waveform, for the air/air function, comprises 128 pulses transmitted at medium frequency of recurrence (MFR), set at 40 kHz. The duty ratio is 10%, i.e. a pulse duration of 2.5 μs. The ground moving target indication (or GMTI) waveform, for the air/ground function, is of the low frequency of recurrence (BFR) type, set at 2 kHz. The duty ratio is also assumed equal to 10% which corresponds to pulses of 50 μs duration. The air/air waveform is assumed to begin after 3 pulse lengths of the air/ground waveform.

In this figure, each column represents one of the 128 pulse repetition intervals (PRI) of the waveform of the air/air function, and contains ten range cells corresponding to the ten pulse lengths in each PRI. A range cell is represented blackened when the reception is cut because of the transmission of a pulse of the air/ground waveform. In a given range gate, there is thus a regular alternation of two missing pulses 32 and twenty available pulses 31, because of the particular choice of the pulse lengths and of the PRI's of the two waveforms employed.

For a one-off echo, the omissions in reception cause numerous secondary lobes in the frequency domain when a conventional Doppler analysis processing is applied with the available data.

For a continuum of powerful echoes received by the ground, all of the secondary lobes created by the omissions in reception can mask the presence of any possible target.

Figure 4:
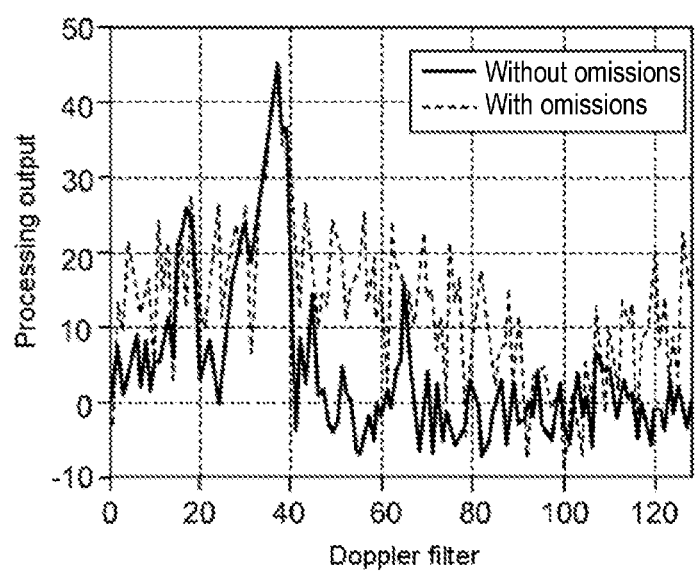
FIG. 4 represents an exemplary graphic representation of the amplitude of signal spectra received in a sum channel, with and without omissions in reception.

FIG. 4 represents an exemplary graphic representation of the amplitude of signal spectra received in a sum channel, with and without omissions in reception.

In this example, it is assumed that the case is that of an airborne radar and of the carrier moving at an altitude of 10,000 feet and at a speed of 240 m/s. The radar points at 45° in relative bearing and 0° in elevation angle and its bandwidth is 4 MHz which corresponds to 10 range gates per pulse duration and 100 range gates per recurrence. It is assumed that, in the range gate number 90, there is a target of speed equal to half the ambiguous speed and of signal-to-noise ratio (SNR) equal to 15 dB.

It is observed that, because of the great dynamic of the spurious ground echoes and the omissions in reception, spurious noise signal peaks greater than 20 dB in almost all of the analysis band are generated. This has the consequence of triggering numerous false alarms although the target is not detected.

In order to take into account the omissions in reception in the processing of the signal and to reduce the nuisance caused thereby, the multifunction radar can comprise at least one processing module programmed to implement the methods for detecting aerial target according to the invention.

An antenna portion 20 comprising a number of subarrays 21 is considered, and in a given range gate. Let $X_n$ be the signal received with the recurrence n. This signal can be written in the form:

$$X_n = \alpha G e^{i2\pi n v T_r} + V_n \text{ with } n \in [0, N-1] \quad (1)$$

in which $X_n$ is a size vector equal to the number of reception subarrays 21, N is the total number of pulses, α represents the (unknown) complex amplitude of the target, G is the vector of the complex gains of the subarrays of the antenna in the direction of the target, v represents the Doppler frequency associated with the target and $T_r$ is the period of recurrence of the pulses.

$V_n$ is a vector representing the signal from the ground echoes received for this range assumption as well as the thermal noise. $V_n$ is assumed Gaussian, centered, and stationary. $Q_0$ is used to denote its autocorrelation matrix.

The modeling of the spurious ground echoes comprises the time correlation from pulse to pulse of the ground returns, assumed stationary, as well as the spatial correlation from one sample to another between two reception channels.

$Q_\delta$ is used to denote the correlation matrix between $V_n$ and $V_{n+\delta}$. The matrix $Q_\delta$ does not depend on the time index n.

If P is used to denote the number of subarrays 21 of the antenna portion 20 considered, the vectors $X_n$, G and $V_n$ are of size P and the matrixes $Q_0$ and $Q_\delta$ are of size P×P.

To take into account the time correlation of the ground echoes, a sliding time horizon of L recurrences, beyond which the correlation of the ground returns is disregarded, is considered. Generally, L is a very small integer compared to N. Conventionally, L is of the order of ten or so, even less, while N is of the order of a hundred or so or even more. The space-time data $Y_n$ in this horizon consist of the vectors $(X_n, \ldots, X_{n+L-1})$ concatenated into a single vector of size PL:

$$Y_n = [X^*_n, \ldots, X^*_{n+L-1}]^* \text{ with } n \in [0, N-L] \quad (2)$$

The sign * designating the transposition and conjugation of a vector or a complex matrix.

The space-time pointing vector, C, and the space-time autocorrelation matrix associated with the clutter, Q, are likewise defined with a blockwise notation:

$$C = [G, (Ge^{i2\pi vT_r})^*, \ldots, (Ge^{i2\pi(L-1)vT_r})^*]^*, \quad (3)$$
and
$$Q = \begin{bmatrix} Q_0 & Q_1 & \ldots & Q_{L-1} \\ Q_1^* & Q_0 & \ldots & \ldots \\ \ldots & \ldots & \ldots & Q_1 \\ Q_{L-1}^* & \ldots & Q_1^* & Q_0 \end{bmatrix}. \quad (4)$$

The matrix Q is of size LP×LP

With a sliding window of size L, there are (N−L+1) space-time vectors $Y_n$. When data are missing at certain instants, the vectors $Y_n$ are made up of only the $L_n \leq L$ space measurements available in the window $(X_n, \ldots, X_{n+L-1})$:

$$Y_n = \alpha C_n e^{i2\pi n vT_r} + W_n, \quad n=0 \ldots N-L, \quad (5)$$

in which $C_n$ is the vector obtained by eliminating the elements of C corresponding to the indexes of the omissions in the window, and in which $W_n$ is Gaussian, centered, of autocorrelation matrix $\tilde{Q}_n$, obtained by eliminating the corresponding rows and columns. The sizes of $C_n$ and $\tilde{Q}_n$ are respectively $PL_n$ and $PL_n \times PL_n$; since $\tilde{Q}_n$ depends on the time index n, the situation is non-stationary.

By making the additional approximation that the data $Y_n$ are independent in pairs, the probability density of the measurements $(Y_0, \ldots, Y_{N-L})$ is the product of the marginal densities. Then, by replacing α with its value which maximizes the probability density, the following test of generalized maximum likelihood (or GLRT for Generalized Likelihood Ratio Test) is obtained:

$$T(p) = \frac{\left| \sum_{n=0}^{N-L} C_n^* \tilde{Q}_n^{-1} Y_n e^{-i2\pi \frac{np}{N}} \right|^2}{\sum_{n=0}^{N-L} C_n^* \tilde{Q}_n^{-1} C_n} \gtrless \text{threshold} \quad (6)$$

with $p \in [0, N-1]$

In the expression (6), the index p corresponds to that of the Doppler filters and the threshold corresponds to a predefined value making it possible to observe a given false alarm probability.

It should be noted that, in the absence of omissions, the vectors $C_n$ are all equal to C and the matrixes $\tilde{Q}_n$ are all equal to Q. In this particular case, the processing is reduced to a conventional processing, described notably in a publication by J. Ward, "Space-Time Adaptive Processing for Airborne Radars", M.I.T. Lincoln Laboratory Technical Report 1015, December 1994.

In practice, the implementation of the expression (6) requires knowledge of the autocorrelation matrix Q which is unknown. A preferred way of implementing the method according to the invention consists in substituting an estimation of Q for the true matrix in the processing. The estimation of the matrix Q can be made using a statistical test such as, for example, a likelihood maximum test. The estimation of the matrix Q within the meaning of the likelihood maximum can be made when there are no omissions with the following expression:

$$\hat{Q} = \frac{1}{N-L+1} \sum_{n=0}^{N-L} Y_n Y_n^*, \quad (7)$$

The estimation data $Y_n$ can be the data from the range gate under test, or else independent secondary data not containing any target signal.

These data can, for example, be obtained from range gates adjacent to the range gate under test or obtained from previous radar dwells.

The estimation of the parameters of a statistical model with incomplete data can be performed generally with an estimation algorithm like, for example, an "expectation-maximization" algorithm, also known by the initials "EM". This iterative algorithm is a parametric method making it possible to replace the missing data with estimated values, which makes it possible to estimate the required parameters then re-estimate the missing data, then re-estimate the parameters with the extrapolated new data and so on to convergence.

On each iteration, the algorithm applies two distinct steps:
an "expectation" step, or step E, consisting in estimating the missing "information" from the available data and from the value of the parameters determined in the preceding iteration.
a "maximization" step, or step M, consisting in maximizing the likelihood as if there had not been any missing data and in updating the value of the parameter or parameters for the next iteration. The estimation of the parameters of the model by likelihood maximum is made possible by virtue of the estimation of the unknown "information" performed in the preceding step.

The algorithm guarantees that the likelihood increases on each iteration, which therefore leads to increasingly correct estimators.

It should be noted that, in the step E, the missing "information" which is estimated does not correspond to the missing data themselves but rather to the log-likelihood of the complete data.

It is assumed that there is no target signal in the estimation data (use of centered secondary data $Y_n$, with $n \in [0, N-L]$), or that the target signal is very weak compared to the ground returns (use of the supposedly centered test data $Y_n$, with $n \in [0, N-L]$), to estimate Q.

The exhaustive statistics of the model without omission are conventionally given by the coefficients of $\hat{Q}$ in the expression (7) to within the factor (N−L+1):

$$s_{j,k} = \sum_{n=0}^{N-L} y_{j,n} y_{k,n}^* \text{ with } j \text{ and } k \in [1, PL] \quad (8)$$

In this expression, $y_{j,n}$ and $y_{k,n}$ respectively represent the $j^{th}$ component of the vector $Y_n$ and the $k^{th}$ component of the vector $Y_n$ of the expression (2).

On the iteration t, the step E of the EM algorithm consists in calculating the expectation of the exhaustive statistics, conditional on the available data $Y_n$, with $n \in [0, N-L]$, in the model with omissions of the expression (5), and in the current estimate $\hat{Q}^{(t)}$ of the matrix Q. The expectation being a linear operator, the following relationship applies:

$$E[s_{j,k} | \hat{Q}^{(t)}, Y_0, \ldots, Y_{N-L}] = \sum_{n=0}^{N-L} E[y_{j,n} y_{k,n}^* | \hat{Q}^{(t)}, Y_n] \quad (9)$$

In the expression (9), the expectation of each term $y_{j,n} y^*_{k,n}$ has to be calculated. These expectations depend on the availability or non-availability of the data $y_{j,n}$ and $y^*_{k,n}$ as well as their conditional average and covariance:

$$E[y_{j,n} y_{k,n}^* | \hat{Q}^{(t)}, Y_n] = \quad (10)$$

$$\begin{cases} y_{j,n} y_{k,n}^* & \text{if } y_{j,n} \text{ and } y_{j,n} \text{ are available} \\ y_{j,n} \mu_{k,n}^* & \text{if } y_{j,n} \text{ is available and } y_{k,n} \text{ is missing} \\ \mu_{j,n} y_{k,n}^* & \text{if } y_{j,n} \text{ is missing and } y_{k,n} \text{ is available} \\ \mu_{j,n} \mu_{k,n}^* + C_{j,k,n} & \text{if } y_{j,n} \text{ and } y_{k,n} \text{ are missing} \end{cases}$$

with $$\mu_{j,n} = E[y_{j,n} | \hat{Q}^{(t)}, Y_n] \quad (11)$$

and $$C_{j,k,n} = \text{cov}[y_{j,n} y_{k,n}^* | \hat{Q}^{(t)}, Y_n]. \quad (12)$$

The conditional averages (11) and conditional covariances (12) have explicit expressions linked to the linear regression of the missing components over the available components. In effect, since the vectors $Y_n$ are Gaussian and centered vectors, the probability density of a component or of a subset of components of $Y_n$ conditional on the other components is again a normal density, the average and the covariance of which are explicit.

Consequently, in the vectors $Y_n$, the available components that will be denoted $Y_n^{(1)}$ will be distinguished from the missing components that will be denoted $Y_n^{(0)}$. The density of the vector $Y_n^{(0)}$, conditional on $Y_n^{(1)}$ and on the current estimate $\hat{Q}^{(t)}$, is normal, of average $\mu_n$ and covariance $C_n$ given by:

$$\mu_n = \hat{Q}_{01}^{(t)} \hat{Q}_{11}^{(t)-1} Y_n^{(1)}, \text{ and} \quad (13)$$

$$C_n = \hat{Q}_{00}^{(t)} - \hat{Q}_{01}^{(t)} \hat{Q}_{11}^{(t)-1} \hat{Q}_{10}^{(t)}, \quad (14)$$

in which the matrix $\hat{Q}^{(t)}$ is partitioned into ($\hat{Q}_{00}^{(t)}$, $\hat{Q}_{01}^{(t)}$, $\hat{Q}_{10}^{(t)}$, $\hat{Q}_{11}^{(t)}$) relative to the components missing and available in $Y_n$, identified respectively by "0" and "1". It should be noted that the partitioning depends also on the index n but, in order to not overload the notations, this reference is not mentioned. More precisely, the partitioning depends on the pattern of omission, possibly being able to be common to a number of different indexes n.

In the expressions (11) and (12), the quantities $\mu_{j,n}$ and $C_{j,k,n}$ correspond respectively to the $j^{th}$ component of $\mu_n$ in the expression (13) and the $(j,k)^{th}$ coefficient of $C_n$ in the expression (14). This completes the computation of the expression (10) then that of the expression (9) and terminates the step E.

Contrary to the conventional methods, for the step E of the algorithm, the method according to the invention does not seek to estimate or extrapolate the missing data. Differently, it replaces the missing data with their average. It can be noted that, if the missing data (instead of the exhaustive statistics) had been extrapolated with their estimates by linear regression, there would not have been the corrective terms $C_{j,k,n}$ in the expressions (10), (12) and (14).

The step M of the algorithm consists in estimating the parameters of the model, for example by likelihood maximum as if there were no missing data. This estimate is given by the expression (7). It is given by the exhaustive statistics, to within a factor $(N-L+1)^{-1}$. Consequently, the step M consists in dividing the matrix of the coefficients calculated with the expression (9) in the step E, by (N−L+1). The result provides the estimate $\hat{Q}^{(t+1)}$ which is then used in the next iteration. It can be shown, notably with the publication by A. P. Dempster et al. "Maximum Likelihood from Incomplete Data via the EM Algorithm J. R. Stat. Soc., B, vol. 39, no 1, pp. 1-38, 1977", that the algorithm converges toward a local log-likelihood maximum.

Figure 5A:
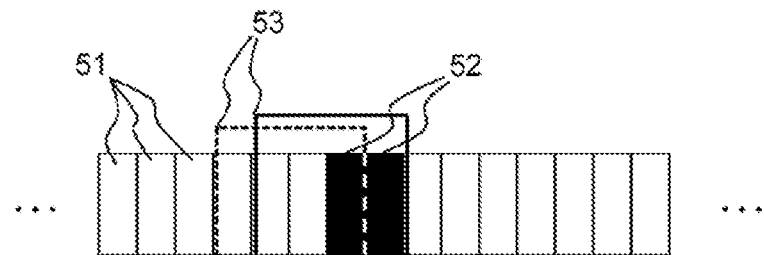
FIGS. 5*a* and 5*b* represent schemes of omission with a sliding window illustrating an iteration of the E-M algorithm.
Figure 5B:
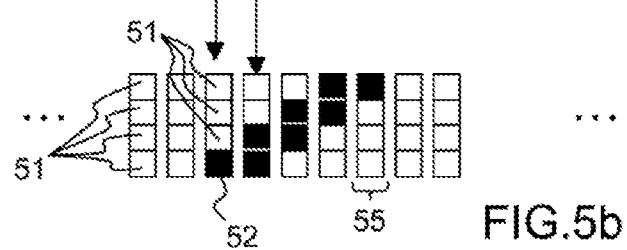

By way of illustration, the scheme of omission of FIGS. 5a and 5b is considered with a sliding time window 53. This example illustrates an iteration of the E-M algorithm.

In FIG. 5a, the signal vectors $X_n$ are represented by rectangles. Each rectangle (or block) represents a spatial datum 51, 52 of size equal to the number of subarrays in the antenna portion considered. The signals effectively received, or available data 51, are represented by white rectangles and the missing data 52 are represented by black rectangles. As previously (FIG. 3), there is once again, periodically, in each range gate, an alternation of missing data 52 for a few consecutive time instants and available data 51 for a larger number of consecutive time instants. Two consecutive blocks representing the missing data 52 have been represented in FIG. 5a, they correspond to the period during which a sub-portion 20 of the antenna transmits and therefore during which the subarrays 21 are cut in reception.

In this nonlimiting example, a sliding time window, or sliding time horizon 53, of four recurrences is considered. It is assumed that the time window moves from left to right over all of the iterations. In this figure, the time horizon 53 has been represented at two particular consecutive instants.

In FIG. 5b, the L=4 blocks representing the spatial data 51, 52 of a window 53 are assembled in a group 55 of space-time data of size PL. As the time window 53 advances, the missing components are propagated with the time index from the last components to the first components of the vector 55 as illustrated in FIG. 5b.

The autocorrelation matrix is estimated using the expressions (7) and (11) to (14) as presented previously.

According to a particular implementation, the method according to the invention comprises a step of grouping of the space-time data vectors 55 according to their scheme of omission, that is to say according to the location of the missing datum or data 52.

Figure 6:
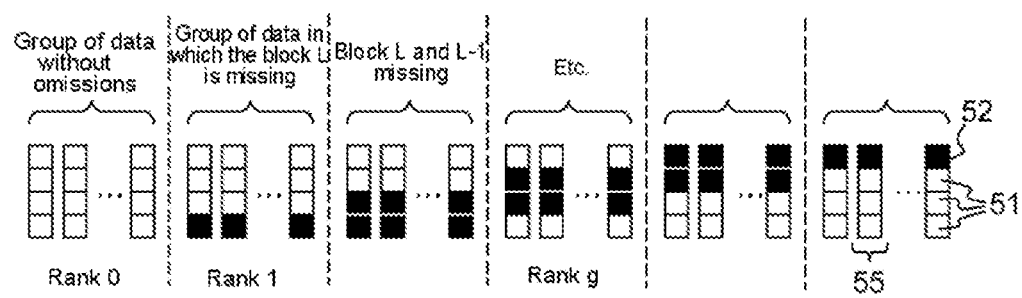
FIG. 6 represents an example of rearrangement of groups of space-time data according to their pattern of omission.

FIG. 6 represents an example of rearrangement of the groups 55 of space-time data of FIG. 5b according to their pattern or scheme of omission. The groups of data 55 that have a same pattern of omission are assembled together. Thus, the groups of data 55 without omission are assembled together. Another assembly is formed from the groups of data 55 of which the last block, of index L, is missing, and so on. Each set of groups of data 55 having an identical scheme of omission is assigned a rank g.

This step of grouping of the data makes it possible, advantageously, to reduce the computation times by processing the groups of data 55 having a same pattern of omission in batches.

As recalled by the relationship (9), the estimate of a sum being equal to the sum of the estimates and the result of a sum not depending on the order in which its terms are added together, the idea is to add the successive contributions of the different groups of data 55, indexed by g, for which the pattern of omissions is the same. In this way, the partitioning and the inversion of sub-matrixes of $\hat{Q}^{(t)}$ is performed just once for all the data concerned.

The estimation algorithm consists, for each group of data, in extrapolating the missing data via the current estimate $\hat{Q}^{(t)}$ in order to compute the contribution of the group g to the estimate $\hat{Q}^{(t+1)}$, while taking into account the corrective term which is also computed via the current estimate $\hat{Q}^{(t)}$. For the group without omission indexed by g=0 there is no extrapolation or corrective term to be computed. Its contribution to the computation of $\hat{Q}^{(t+1)}$ is given by the usual empirical estimator (to within a factor), which can be computed once and for all in order to immediately initialize $\hat{Q}^{(t+1)}$ at each iteration t.

Figure 7:
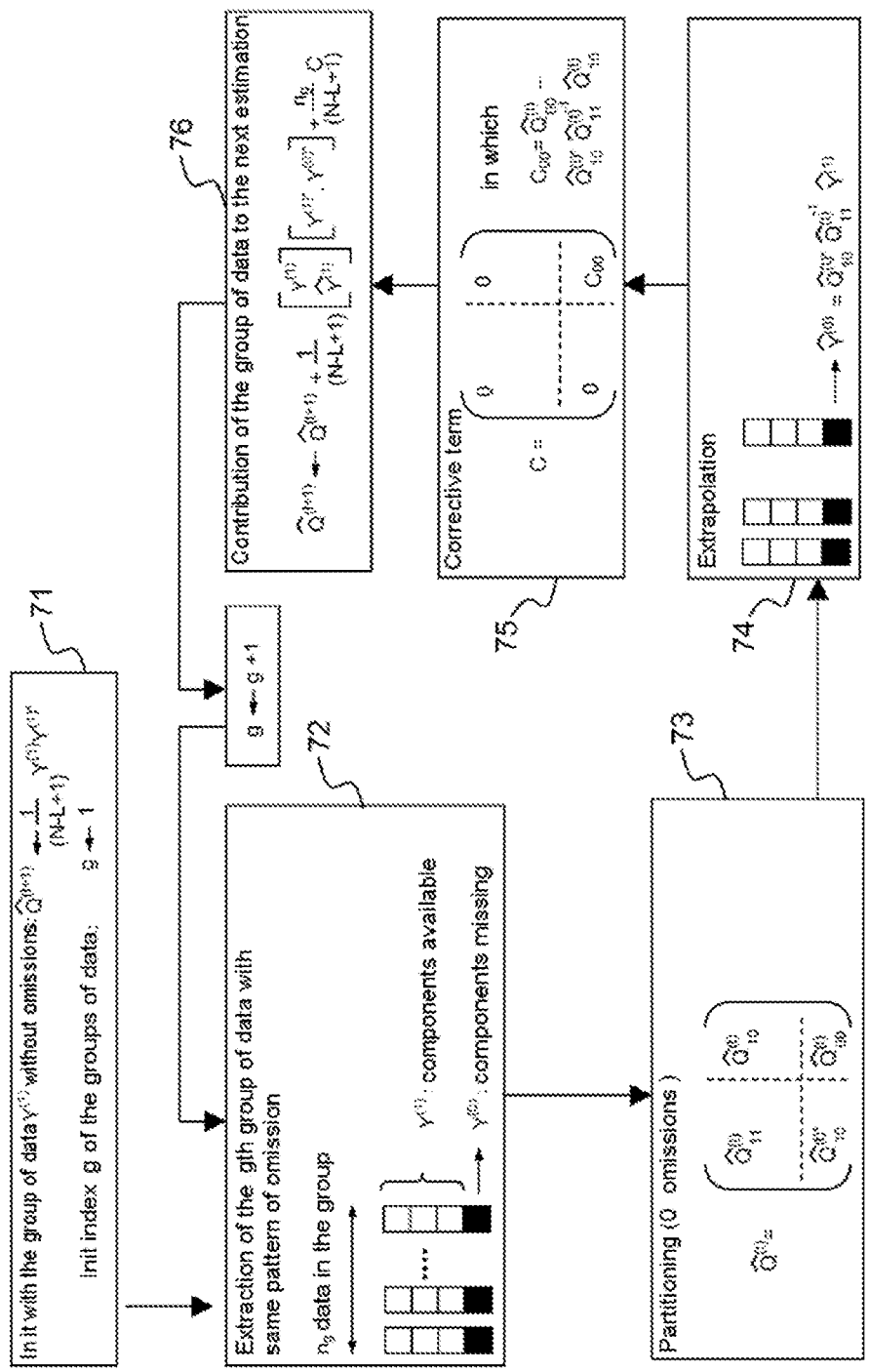
FIG. 7 represents the possible steps of an iteration for estimating the autocorrelation matrix.

FIG. 7 presents the possible steps of an iteration t for estimating the autocorrelation matrix Q. For reasons of conciseness and in order to avoid overloading the figure, in this example, $n_g$ has been used to denote the number of data in the group of index g, and N'=N−L+1 to denote the total number of groups of space-time data 55.

On each iteration t, each group of data 55 with a certain pattern of omissions contributes to the computation of $\hat{Q}^{(t+1)}$ via the expressions (10) to (14).

A first initialization step 71 is performed with the groups of data 55 without omission. The estimation of the matrix Q on the iteration (t+1) is computed using the expression (7) in which the sum is restricted to the data without omissions. The index g of the rank of the groups of data 55 to be processed is initialized at 1.

In the next step 72, the groups of data 55 of rank g are extracted. The vector $Y^{(1)}$ made up of the available data 51 and the vector $Y^{(0)}$ made up of the missing data 52 are considered.

During a partitioning step 73, the current estimate $\hat{Q}^{(t)}$ of the matrix Q is partitioned into ($\hat{Q}_{00}^{(t)}$, $\hat{Q}_{01}^{(t)}$, $\hat{Q}_{10}^{(t)}$, $\hat{Q}_{11}^{(t)}$) relative to the components missing and available in $Y_n$, identified respectively by the indexes "0" and "1".

The sub-matrix $\hat{Q}_{00}^{(t)}$ is extracted from $\hat{Q}^{(t)}$ by retaining only its rows and its columns of indexes corresponding to the missing data. The sub-matrix $\hat{Q}_{01}^{(t)}$ is extracted from $\hat{Q}^{(t)}$ by retaining only its rows of indexes corresponding to the missing data and its columns of indexes corresponding to the available data. The sub-matrix $\hat{Q}_{10}^{(t)}$ is extracted from $\hat{Q}^{(t)}$ by retaining only its rows of indexes corresponding to the available data and its columns of indexes corresponding to the missing data. The sub-matrix $\hat{Q}_{11}^{(t)}$ is extracted from $\hat{Q}^{(t)}$ by retaining only its rows and its columns of indexes corresponding to the available data.

The estimation of the matrix Q is computed as a function of the vectors $Y^{(1)}$ of available data 51 and the vectors $Y^{(0)}$ of missing data 52.

The partitioning 73 makes it possible to replace the missing data with their average in the step 74 using the expression (13) and to compute the corrective term C in the step 75 using the expression (14).

Finally, a step 76 makes it possible to compute the contribution of the set of groups of data 55 considered to the estimation of the matrix $\hat{Q}^{(t)}$.

The index of the rank g is incremented by one so as to take into account the next set of groups of data 55 and the algorithm loops to the extraction step 72. The loop ends when all the sets of groups of data have been taken into account. If the example of FIG. 6 is considered, in addition to the group of data without omissions, there are five sets of groups of data 55 having identical patterns of omission. In this case, the index g of these sets varies from 1 to 5.

Figure 8:
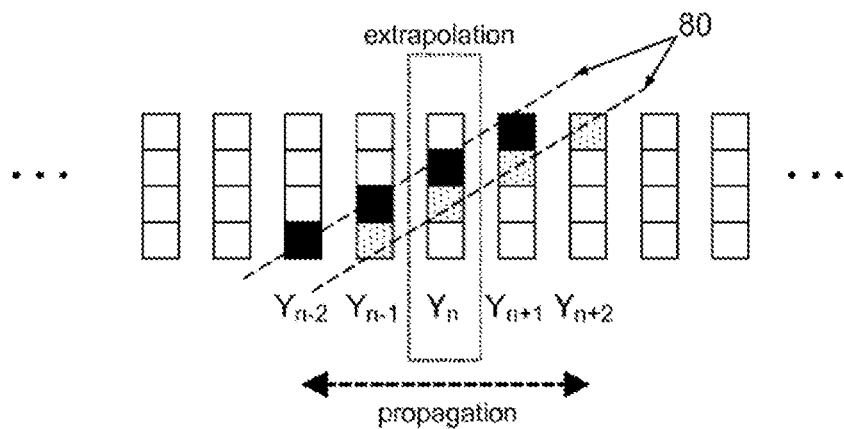
FIGS. 8 and 9 illustrate variant implementations of the method according to the invention.
Figure 9:
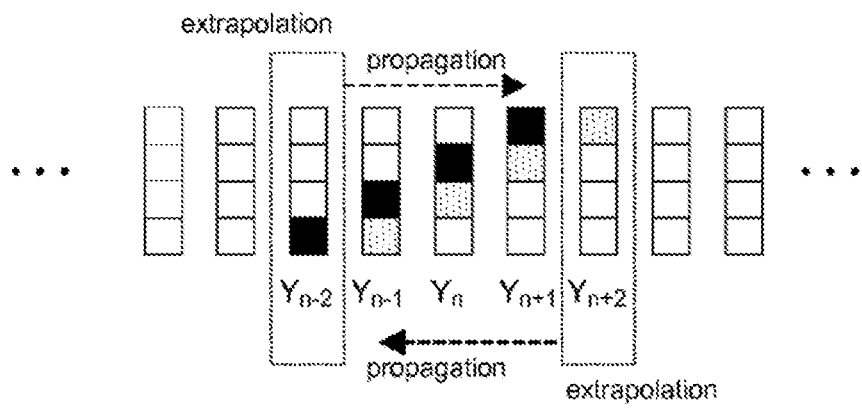

FIGS. 8 and 9 illustrate variant implementations of the method. As previously, a time window of length L=4 is considered. Obviously, this example is in no way limiting and can be generalized to any size of time window 53.

Since a sliding time window 53 is used, there are values which are copied during the movement of this window 53. One way of reducing the computation time can consist in performing the estimation of the missing values 51 once and then have this estimated value propagated over the "diagonals" 80.

A first variant is presented in FIG. 8. In this example, the replacement of the missing data 52 with their average is performed on a group of data 55 comprising the two missing data 52. These replacement values are then re-used without computation for the neighboring groups of data 55. In the example of FIG. 8, the two missing data 52 are replaced on the group of data 55 for which the missing components 52 are situated at the center of the space-time vectors $Y_n$, then the replacement values are propagated to the neighboring groups of data 55. The value of a missing datum 52 is copied onto the groups of data $Y_{n-2}$ to $Y_{n+1}$ and the value of the second onto the groups of data $Y_{n-1}$ to $Y_{n+2}$.

Once the replacement values have been computed, the latter can, for example, be stored in a memory area to be able to be recalled and reused without computation, thus reducing the processing time.

FIG. 9 presents another variant implementation. In this variant, the missing data 52 are replaced by their average only for the groups of data for which the missing data 52 are situated at the head or at the tail of the groups of space-time data 55, that is to say the groups of space-time data 55 containing only a single missing datum 52.

In the example illustrated, the missing data 52 are replaced only for a block of the group of data $Y_{n-2}$ and a block of the group of data $Y_{n+2}$. The values of the averages are then propagated to the neighboring vectors, $Y_{n-1}$ to $Y_{n+1}$ for a first missing datum and $Y_{n+1}$ to $Y_{n-1}$ for the second missing datum.

This grouping of the space-time data 55 can also be used advantageously for the test of the generalized maximum likelihood of the expression (6). In effect, the sums which appear on the numerator and on the denominator of the processing can be computed effectively by adding the successive contributions of each group of missing data, in a similar manner.

Figure 10:
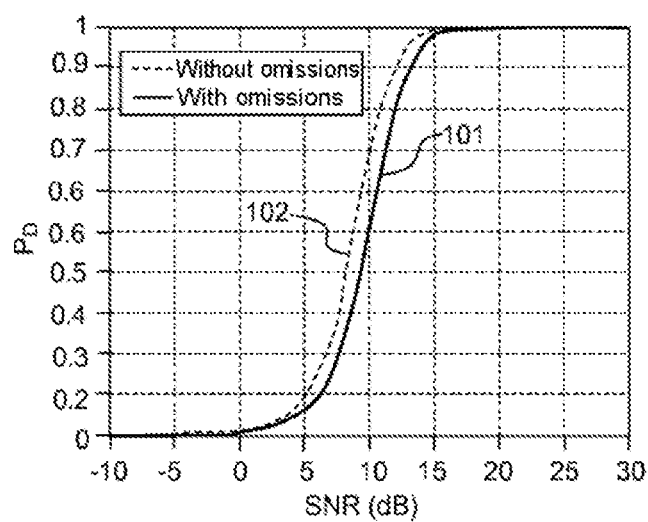
FIG. 10 represents an illustration of results obtained by the method according to the invention.

FIG. 10 illustrates an example of a result obtained by applying the method according to the invention. This figure represents the probability of detection $P_D$ as a function of the signal-to-noise ratio (SNR) of the target, by comparing the detection performance levels in the cases of a reception signal with omissions 101 compared to the performance levels obtained in the case of a signal without omissions 102.

In this example, the antenna used is that presented in FIG. 2. The antenna portion 20 used comprises P=4 spatial reception channels and the main parameters associated with the carrier and with the radar are assembled in the following table.

| Radar parameters | |
| --- | --- |
| Number of pulses (N) | 128 |
| Recurrence frequency ($F_r$) | 40 kHz |
| Wavelength ($\lambda$) | 3 cm |
| Transmitted power ($P_e$) | 5 kW |
| Bandwidth (B) | 4 MHz |
| Duty Ratio (F) | 10% |
| Flight parameters | |
| Altitude (h) | 10,000 feet |
| Speed (V) | 240 m/s |
| Observation angles in the horizontal ($\alpha_g$) and vertical ($\alpha_s$) plane | 45° and 0° |

The terrain considered has a radar reflectivity which varies with the sine of the angle of incidence on the ground. The detection threshold is set so as to have a probability of false alarm of $5 \times 10^{-4}$.

Compared to the case without omissions, the proposed method exhibits a loss of approximately 1 dB, uniformly for all the detection probabilities, including the loss of energy budget due to the missing pulses. For this example, of the 128 pulses of the waveform, 12 are missing. The corresponding energy loss is 116/128, i.e. −0.4 dB. The losses of the proposed method intrinsically due to the omissions are consequently approximately −0.6 dB.

The invention claimed is:

1. A method for detecting aerial targets, implemented by a multifunction radar comprising an antenna subdivided into at least two antenna portions, each antenna portion being configured to perform the transmission and the reception of a signal, the method comprising:
   each antenna portion of the radar is configured to transmit signals on distinct frequency bands,
   during the transmission phases of an antenna portion, the reception of each antenna portion of the radar is cut resulting in a reception signal comprising missing data,
   the radar is configured to simultaneously perform at least two radar functions including an aerial target detection function,
and wherein the method comprises, for each range gate:
   a step of reception of signals,
   a step of estimation, from the signals received, of a space-time autocorrelation matrix so as to model the spurious ground echoes,
   a step of target detection using a statistical test by taking into account missing data in the reception signals and said space-time autocorrelation matrix.

2. The method of claim 1, wherein the step of target detection is performed using a test of generalized maximum likelihood.

3. The method of claim 1, wherein, in the step of estimation of the autocorrelation matrix, the missing data are replaced by the average of the signals effectively received.

4. The method of claim 3, wherein the step of estimation of the autocorrelation matrix is performed using an estimation algorithm.

5. The method of claim 4, wherein the step of estimation of the autocorrelation matrix is performed using an expectation-maximization algorithm.

6. The method of claim 1, wherein the step of estimation of the autocorrelation matrix comprises a step of grouping of the data to form groups of data having an identical pattern of omission.

7. The method of claim 3, wherein the averages by which the missing data have been replaced are stored in memory so as to be re-used without computation.

8. The method of claim 1, wherein the time correlation of the ground echoes is taken into account by using a sliding time window.

9. The method of claim 1, wherein the step of target detection comprises a step of grouping of the data according to their pattern of omissions.

10. A multifunction radar configured to implement the method of claim 1, comprising an antenna subdivided into at least two portions, each antenna portion comprising at least one transmission module and at least one reception module, each transmission module being configured to transmit transmission signals on distinct frequency bands and each reception module being configured to interrupt the reception when a transmission module transmits, the radar further comprising at least one processing module configured to implement the method of claim 1, wherein said radar is configured to simultaneously perform at least two radar functions, including an aerial target detection function.

11. The radar of claim 10, wherein at least one antenna portion is divided into a number of subarrays, the group of at least one transmission module of the antenna portion being configured to group said subarrays together, during the transmission phase, so as to form just a single transmission channel.

12. The radar of claim 10, wherein said radar is an airborne radar.

* * * * *